United States Patent [19]

Adachi

[11] Patent Number: 5,319,597

[45] Date of Patent: Jun. 7, 1994

[54] FIFO MEMORY AND LINE BUFFER

[75] Inventor: Kenya Adachi, Ibaraki, Japan

[73] Assignee: Texas Instruments Incorporated, Dallas, Tex.

[21] Appl. No.: 892,449

[22] Filed: Jun. 2, 1992

[51] Int. Cl.[5] .......................... G11C 7/00; G11C 19/28

[52] U.S. Cl. ............................ 365/189.05; 365/230.05; 365/230.08

[58] Field of Search ...................... 365/189.05, 230.08, 365/230.05

[56] References Cited

U.S. PATENT DOCUMENTS 4,715,017 12/1987 Iwahashi ........................ 365/230.08

FOREIGN PATENT DOCUMENTS 3-37898 2/1991 Japan .

Primary Examiner—Eugene R. LaRoche
Assistant Examiner—Viet Q. Nguyen
Attorney, Agent, or Firm—Douglas A. Sorensen; Richard L. Donaldson

[57] ABSTRACT

This invention provides a FIFO memory device having a simple circuit structure without using a cache memory, and line buffers used in the FIFO memory device having a simplified circuit structure.

The FIFO memory device comprises a read line buffer (5) having a two-step structure in place of a cache memory which stores and outputs the first data. The read line buffer (5) outputs the data from the memory array (4). Namely, the read line buffer (5) comprises first-step master latch circuits (33) and (34) and a second-step slave latch circuit (37), and the single master latch circuit (33) functions equivalent to the cache memory. In addition, the number of line buffers is reduced by multiplying the selection of memory array (4) bit lines (BL) using transfer gates (11-14).

12 Claims, 3 Drawing Sheets

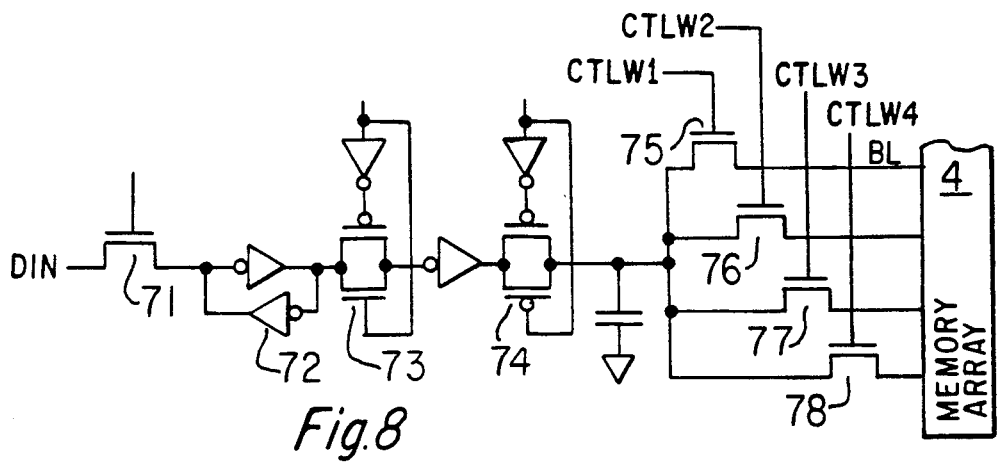
Fig.8
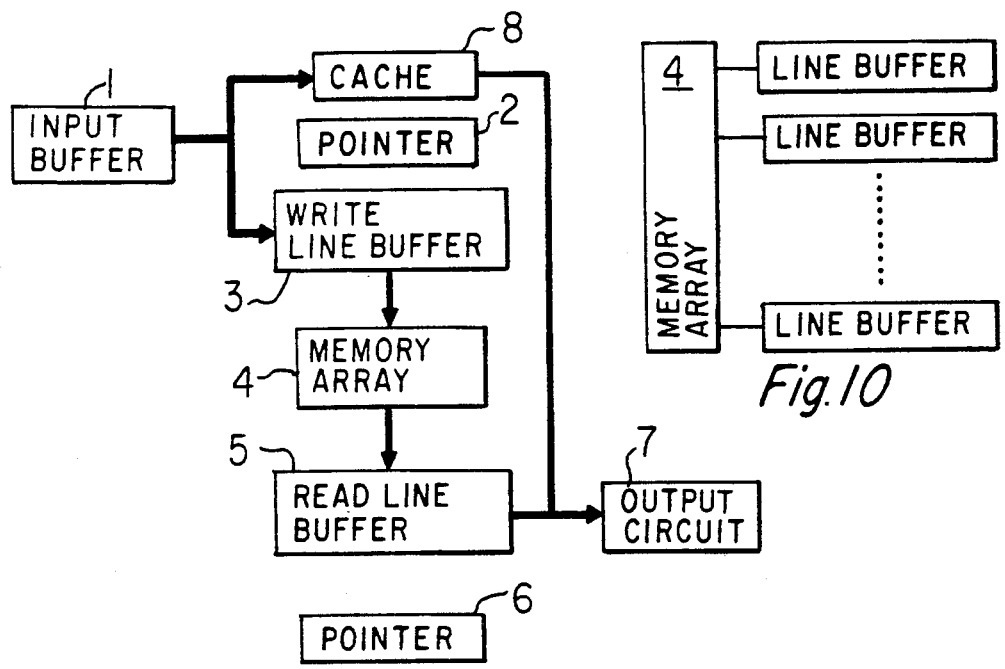
Fig.9
Fig.10

FIFO MEMORY AND LINE BUFFER

The present invention pertains to a semiconductor memory device, such as a FIFO (First In First Out) memory device, and line buffers which are used with the semiconductor memory device. In particular, it pertains to a FIFO memory device in which a cache memory is not used, and to line buffers used with a FIFO memory device having a reduced number of circuits.

PRIOR ART

FIG. 9 shows the structure of a conventional FIFO memory device. This FIFO memory device comprises an input buffer (1), cache memory (8), write pointer (2), write line buffer (3), memory array (4), read line buffer (5), read pointer (6), and output circuit (7).

The memory array (4) is formed by dynamic random access memories (DRAM) which store a large amount of data. It functions to temporarily store the data during FIFO operations. With this FIFO memory device, a cache memory (8), which comprises static random access memories (SRAM) having a high operating speed and containing several tens of bits of memory capacity, is used in addition to the memory array (4) composed of DRAMs in order to read the data continuously.

FIG. 10 shows the structure of the read line buffer (5). The read line buffer (5) comprises 1-bit line buffer circuits (LINE BUF) situated on each bit line (BL) of the memory array (4). The write line buffer (3) also comprises 1-bit line buffer circuits (not shown) attached to each bit line (BL), in the same manner as shown in FIG. 10.

The first several tens of bits of data from the input buffer (1) are input and stored in the cache memory (8). The following data are then input from the input buffer (1) into the write line buffer (3), then stored in the memory array (4) via the write line buffer (3).

When reading these data, the data are output from the cache memory (8) to the output circuit (7) in response to a read reset signal (not shown). During this data output procedure, the data stored in the memory array (4) are transferred from the memory array (4) to the read line buffer (5). When the data at the last address in the cache memory (8) are output, the data are output from the read line buffer (5) to the output circuit (7).

The FIFO operations are carried out as described above. In particular, the cache memory (8) is used in order to read the first data during the FIFO operations.

With the aforementioned FIFO device, it is necessary to use an SRAM cache memory (8) in the aforementioned manner. Thus, it is necessary to control both the DRAM memory array (4) and SRAM cache memory (8) using different control methods. This is problematic in that the control procedures are made more complex, hence increasing the importance of switching timing for these controls.

In addition, there is the layout problem of increased surface area, due to the fact that a separately installed cache memory (8) is used.

In addition, since line buffers are attached to each of the bit lines (BL), there is the problem of increased surface area in the FIFO memory device as the capacity of the memory array (4) is increased.

OBJECT OF THE INVENTION

In light of the above problems, it is an object of the present invention to provide a practical FIFO memory device with a small surface area, and line buffers to be used in the FIFO memory device.

SUMMARY OF THE INVENTION

The present invention provides a semiconductor memory device which comprises a memory array, write line buffer for writing data onto the aforementioned memory array, and a read line buffer for outputting the data in the order stored in the aforementioned memory array; wherein said semiconductor memory device is characterized in that the aforementioned read line buffer comprises a first line buffer circuit structured to store the first data and output the aforementioned stored data in response to a read signal, and a second line buffer circuit structured to output data from the memory array after the first line buffer circuit data output procedure is completed.

In addition, the present invention provides line buffers which comprise a number of blocks of line buffer circuits arranged in parallel, wherein each of the aforementioned line buffer circuits comprises the following: a first group of gate circuits for selecting a number of bit lines in the memory device; latch circuit means, at least two of which are connected to the aforementioned first group of gate circuits, arranged in parallel, and designed to operate on different timings; a second group of gate circuits, which are situated on the output end of the aforementioned latch circuit means, and which selectively outputs the contents of the latch circuits means according to different timings; and a latch circuit situated on the output end of the aforementioned second group of gate circuits.

The read line buffer is formed in the two-step structure described above. The first read line buffer functions in the same manner as the conventional cache memory by storing the first data, then outputting that stored data first during the read procedure. This makes it possible to achieve FIFO performance without following the conventional practice of using a cache memory, which is a memory device having a control method and manufacturing method different from those of the memory array. In particular, controlling is made easier because different memory control methods are no longer required.

In addition, it is possible to make a considerable reduction in the number of line buffer circuits by installing a first group of line circuit means, second group of line circuit means, and gate circuits in order to multiply the memory array bit lines.

BRIEF DESCRIPTION OF THE DRAWINGS

FIG. 8 is a detailed diagram of the circuitry in the write line buffer shown in an embodiment of the present invention.

FIG. 9 is a diagram of the structure of a conventional FIFO memory device.

FIG. 10 is a diagram of the circuitry of a conventional read line buffer used in FIG. 9.

Figure 1:
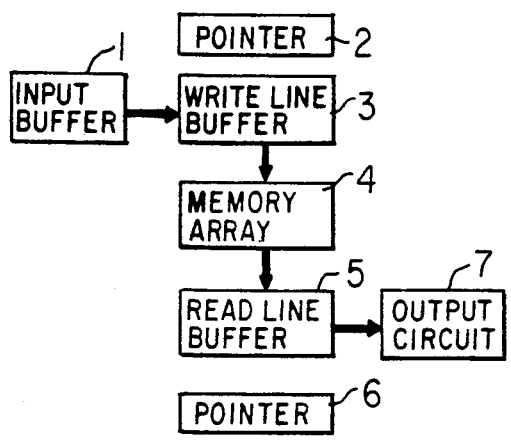
FIG. 1 is a diagram of the structure of an embodiment of the FIFO memory device of the present invention.

Explanation of the numbers
1. Input buffer
3. Write line buffer
4. Memory array
5. Read line buffer
7. Output circuit

DESCRIPTION OF THE PREFERRED EMBODIMENTS

The embodiments of the present invention comprising line buffers and a FIFO memory device in which they are used will be described below with reference to FIGS. 1-8.

FIG. 1 is a structural diagram of a FIFO memory device which is an embodiment of the present invention.

This FIFO memory device has the structure of the conventional FIFO memory device shown in FIG. 9, with the cache memory (8) removed. In place of the cache memory (8), a read line buffer (5), having a two-step structure to be described below, is installed.

In the present embodiment as well, the memory array (4) is composed of DRAMs.

Figure 2:
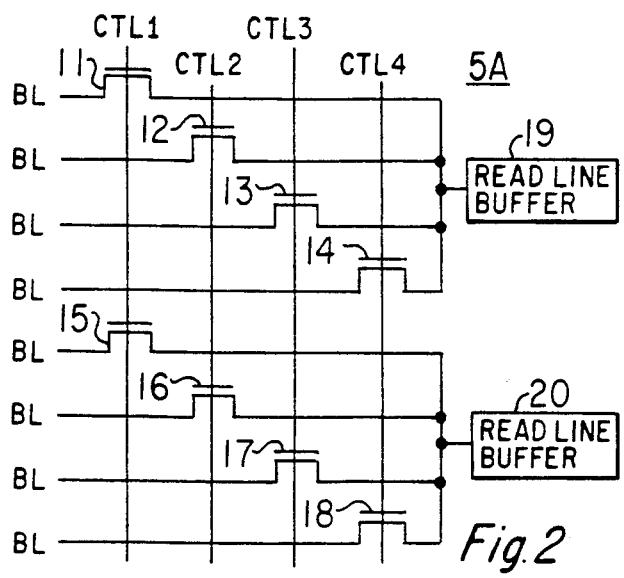
FIG. 2 is a schematic diagram of a first embodiment of the read line buffer of the present invention to be used in the FIFO memory device shown in FIG. 1.

FIG. 2 shows part of the circuit structure of a read line buffer (5A), which is the first embodiment of the read line buffer (5).

The read line buffer (5A) shown in FIG. 2 comprises transfer gate groups (11-14) and (15-18) which are connected to each of four bit lines (BL) in the memory array (4), and 1-bit read line buffer circuits (RLB) (19) and (20) which are attached after the transfer gates. These 1-bit RLBs (19) and (20) are connected to the output circuit (7) shown in FIG. 1.

As is clear from this circuit structure, the four transfer gates (11-14), which consist of transistors having a simple circuit structure, are combined. The transfer gates (11-14) are selectively driven according to control signals (CTL1-CTL4) to select one of the bit lines (BL). Thus, only a single RLB (19) is necessary for the four bit lines (BL). As a result, the surface area of the read line buffer (5A) is reduced, thus reducing the layout of the FIFO memory device.

Figure 3:
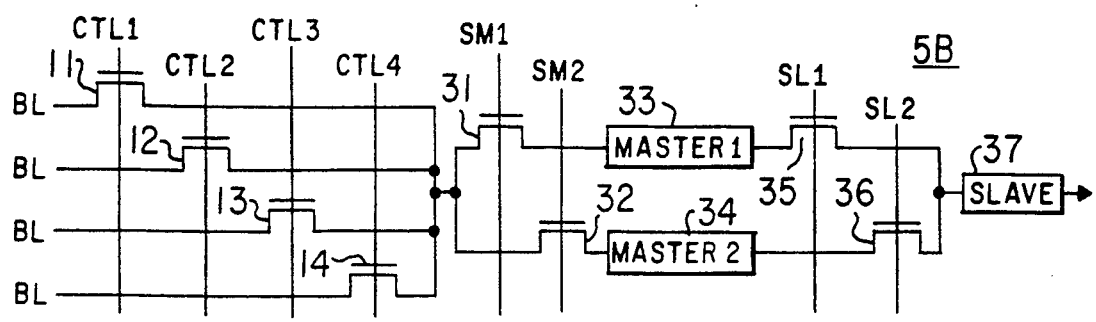
FIG. 3 is a schematic diagram of a second embodiment of the read line buffer of the present invention to be used in the FIFO memory device shown in FIG. 1.

FIG. 3 shows the circuit structure of the read line buffer (5B) which is a second embodiment of the read line buffer (5).

This read line buffer (5B) is structured to comprise, in place of the cache memory (8) shown in FIG. 9, a two-step read line buffer structure consisting of two combined master latch circuits (33) and (34) in the first step, and a slave latch circuit (37) in the second step.

The transfer gates (11-14) connected to the bit lines (BL) are the same as those shown in FIG. 2. Namely, the outputs of the four bit lines (BL) are selectively output according to the control signals (CTL1-CTL4).

The transfer gates (31) and (32) are installed so that the data which are selectively output from the memory array (4) via the transfer gates (11-14) are input to either one of the master latch circuits (33) and (34).

In addition, the transfer gates (35) and (36) are installed so that the data of the master latch circuit (33) or master latch circuit (34) are selectively output to the slave latch circuit (37).

The master latch circuit (33) comprises functions equivalent to those of the conventional cache memory (8), and has the capacity to store the first several tens of bits of data which would be input to the cache memory (8). The master latch circuit (34) stores the data transferred from the memory array (4) during data reading in the same manner as the conventional product.

In the initial operation of the FIFO memory device shown in FIG. 1, a control circuit (not shown) allows the write line buffer (3) to store the first several tens of bits of data in response to a write reset signal (not shown). When the data are written in to the last address in the write line buffer (3), a transference request is output from the control circuit to the memory array (4). When the request is received by an arbiter (not shown) inside the memory array (4), the data are transferred to and stored in the memory array (4). When the transference is completed, a request for transferring the data from the memory array (4) to the master latch circuit (33) is output from the control circuit. The transfer gate (31) is then turned on by a first master latch circuit selecting signal (SM1), allowing the data in the memory array (4) to be transferred through the bit line (BL) to the master latch circuit (33) to be stored in the master latch circuit (33). The first data, which are the same as those stored in a conventional cache memory (8), are thus stored in the master latch circuit (33). Next, the data input to the write line buffer (3) are sequentially stored in the memory array (4).

When the data are sequentially output from the master latch circuit (33) in response to a read reset signal (not shown) serving as a read command, and the final data of the master latch circuit (33) are read, a request for transference of data to the master latch circuit (34) is output from the control circuit to the memory array (4). When this is received, a second master latch circuit selecting signal (SM2) is output to turn on the transfer gate (32), thereby allowing the data in the memory array (4) to be stored in the master latch circuit (34). When the final data in the master latch circuit (34) are read, the next data transference request is output from the control circuit.

The data output from the first and second master latch circuits (33) and (34) are output to the output circuit (7).

As described above, it is possible to carry out the same FIFO processes as those of a conventional FIFO memory device, without a cache memory (8), by forming the read line buffer (5) in a two-step structure. In addition, there are no longer layout problems caused by the presence of the cache memory (8), and there is no longer the difficulty of controlling the memory array (4), composed of DRAMS and the cache memory (8), composed of SRAMs, using different control methods. Thus, the structure of the control circuit is also simplified.

In addition, since an SRAM cache memory (8) and DRAM memory array (4) are not used in combination, it is possible to form the FIFO memory device using manufacturing procedures for manufacturing the memory array (4), making it possible to achieve a single-chip structure easily.

Figure 4:
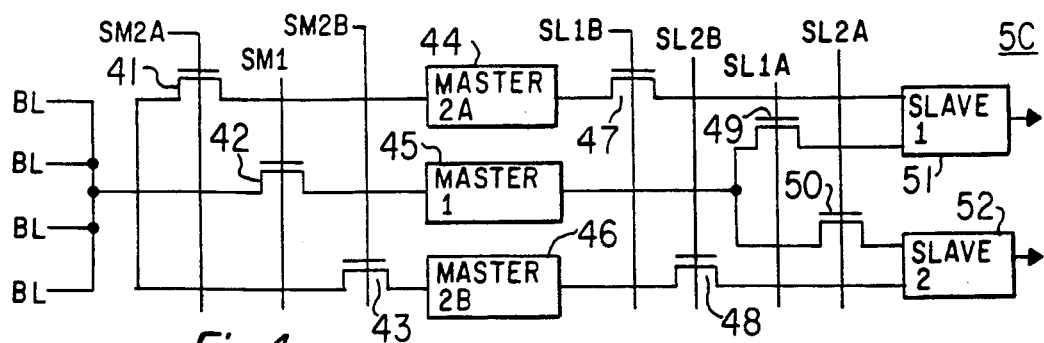
FIG. 4 is a schematic diagram of a third embodiment of the read line buffer of the present invention to be used in the FIFO memory device shown in FIG. 1.

FIG. 4 shows part of the circuit structure of a read line buffer (5C), which is a version of the read line buffer (5) in which a 2-port structure is used.

Two second-step latch circuits, namely, slave latch circuits (51) and (52) are installed for the two ports.

When two ports are used in the read line buffer (5), it is necessary under normal conditions to use two of the two-step read line buffers described with reference to FIG. 3, for four bits. However, since the data stored in the first master latch circuit (33) shown in FIG. 3 are the first several tens of bits of data in terms of address, they can be used in common, without requiring separate first master latch circuits (33) for each port. Thus, in terms of master latch circuits, it is sufficient to install a master latch circuit (45), which corresponds to the master latch circuit (33) in FIG. 3, and master latch circuits (44) and (46) for the two ports, corresponding to the master latch circuit (34) in FIG. 3. Two slave latch circuits (51) and (52) are used for the two ports.

The transfer gates (41-43) after the bit lines (BL) are gates which select the data to be transferred to the master latch circuits (44-46). The transfer gates (47-50) are gates which select the data to be transferred from the master latch circuits (44-46) to the slave latch circuits (51) and (52). The transfer gates (49) and (50) are gates which transfer the first data stored in the master latch circuit (45), and the transfer gates (47) and (48) are the gates which transfer the data stored in the memory array (4).

The same structure as that described above is also used with structures having read line buffers (5) with less than four ports or five or more.

Figure 5:
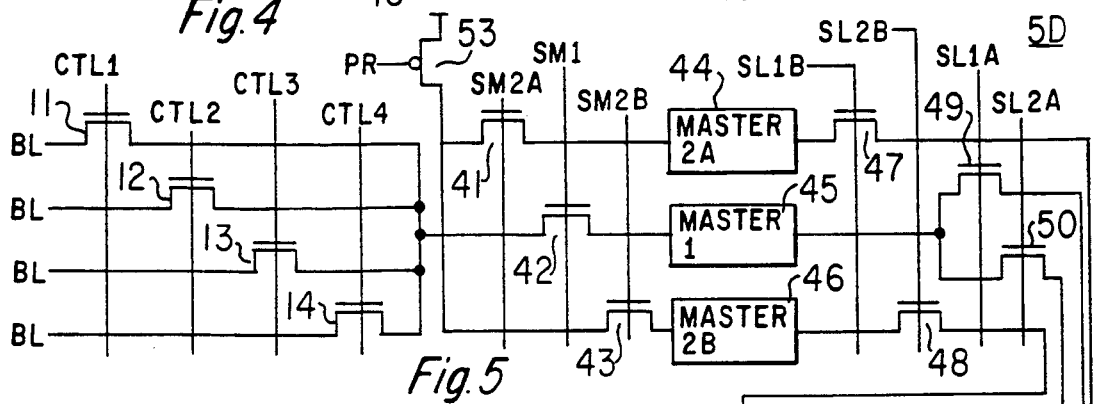
FIG. 5 is a schematic diagram of a fourth embodiment of the read line buffer of the present invention to be used in the FIFO memory device shown in FIG. 1.

FIG. 5 is a diagram of part of the circuit structure of a read line buffer (5D) which is an alteration of the read line buffer (5C) shown in FIG. 4.

This read line buffer (5D) has a structure in which the transfer gates (11-14), which select the bit lines (BL) shown in FIG. 2 and FIG. 3, are attached to the read line buffer (5C) shown in FIG. 4. In addition, it comprises a precharging transistor (53).

The operations of this read line buffer (5D) include the transfer gate selection operations shown in FIG. 2 and FIG. 3, and the operations of the 2-port read line buffer shown in FIG. 4.

Figure 6:
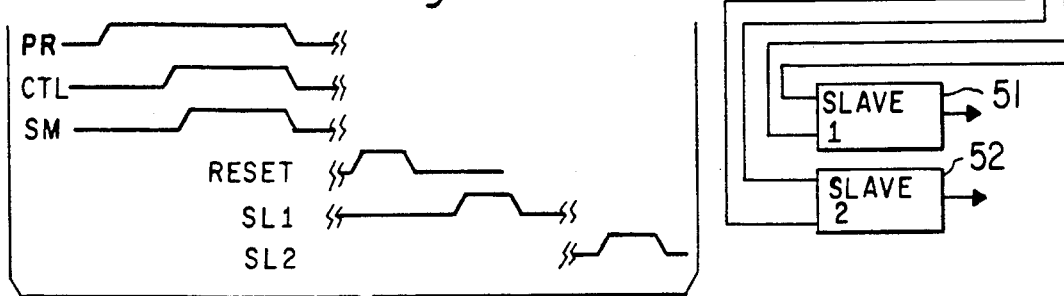
FIG. 6 is a chart of the operation timings of the read line buffer shown in FIG. 5.

FIG. 6 shows the operation timings for the read line buffer (5D) shown in FIG. 5.

First, precharging (PR) is carried out, and a control signal (CTL) for selecting one of the transfer gates (11-14) is output. Next, a master latch circuit selecting signal (SM), which drives the transfer gates (41-43) in order to select the data to be transferred to the master latch circuits (44-46), is output. The data are transferred from the input buffer (1) or memory array (4) to the master latch circuit (45) or master latch circuits (44) and (46). When this is completed, a reset signal RESET is input, thereby outputting to the transfer gates (47-50) a slave latch circuit selecting signal (SL1) or (SL2), used to carry out the operation of transferring the data to the slave latch circuit (51) or (52) from the master latch circuit corresponding to that reset signal.

The aforementioned read line buffers (5B-5C), shown in FIGS. 3-4, also operate according to the same timings as the operation timings shown in FIG. 6.

Figure 7:
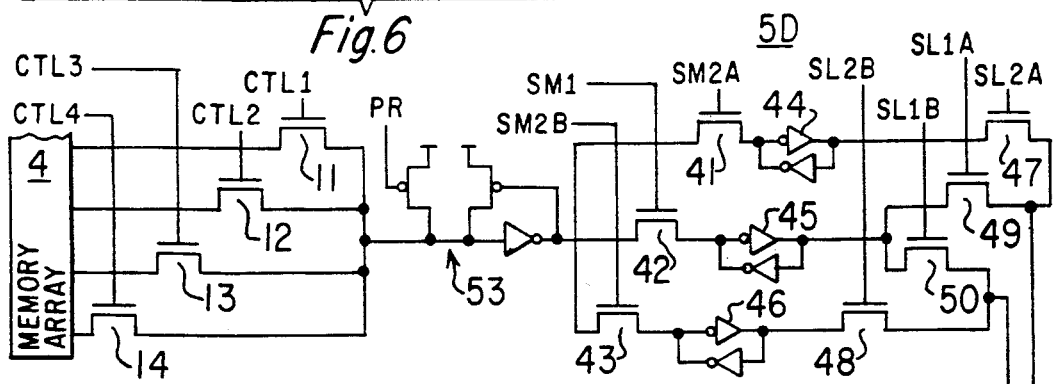
FIG. 7 is a detailed diagram of the circuitry in the read line buffer shown in FIG. 5.
Figure 7:
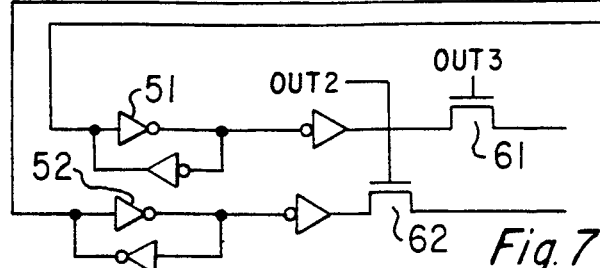

FIG. 7 is a detailed schematic diagram of the read line buffer (5D) shown in FIG. 5. The components indicated by the same symbols as in FIG. 5 denote the same circuit elements as the circuit elements in FIG. 5.

The master latch circuits (44-46) and slave latch circuits (51) and (52) are all composed of simple 1-bit static latch circuits in which the invertors are connected in reverse parallel.

It should be noted that the read line buffer (5D) shown in FIG. 7 also comprises transfer gates (61) and (62), which are used to transfer data to the output circuit (7) from the slave latch circuits (51) and (52).

FIG. 8 shows part of the circuit structure of the write line buffer (3) shown in FIG. 1.

In the same manner as in the structures of the various circuits in the master latch circuit (5) described above, the write line buffer (3) comprises transfer gates (75-78) which selectively drive the four bit lines (BL) of the memory array (4). The transfer gates (75-78) are selectively driven according to write selecting control signals (CTLW1-CTLW4) from the control circuit (not shown).

The use of these transfer gates (75-78) makes it possible to use, for the four bit lines (BL), only a single write line buffer (72), composed of a static latch circuit with the invertors installed in reverse parallel.

The transfer gate (71) selects 1-bit input data (DIN) to be transferred to the write line buffer (72).

In addition to the circuit structure described above, it is possible to employ a variety of alterations in applying the present invention. For example, it is possible to perform selective drive operations for a number of lines, in addition to the aforementioned description of a case in which four bit lines (BL) at a time are selectively driven.

As described above, with the two-step read line buffer of the present invention, it is possible to provide a FIFO memory device, equivalent to one containing a cache memory, without using a cache memory. In addition, less surface area is required than with a FIFO memory device in which a cache memory is used, thus simplifying controls.

In addition, when a number of bit lines are selectively driven via transfer gates in the manner of the present invention, the number of write line buffer circuits is reduced dramatically, thus reducing even further the aforementioned surface area, and simplifying the circuit structure as well.

In addition, since a cache memory is not used, it is possible to form the FIFO memory device on a single chip using manufacturing procedures for forming a memory array.

What is claimed is:

1. A FIFO memory device comprising:
   a memory array having a plurality of bit lines;
   a write line buffer, said write line buffer receiving incoming data bits and providing said incoming data bits on said plurality of bit lines for storage in said memory array;
   a read line buffer connected to said bit lines of said memory array, said read line buffer including a plurality of master latches, a plurality of first transfer gates controlling the transfer of data from said bit lines to said master latches, a plurality of slave latches, and a plurality of second transfer gates controlling the transfer of data from said master latches to said slave latches;
   an output port addressably connected to said slave latches.

2. The memory device of claim 1 wherein said memory device is formed in a single substrate.

3. The memory device of claim 1 wherein said write line buffer receives said data bits via an input buffer.

4. The memory device of claim 1 wherein there is one of said master latches for every three of said bit lines.

5. The memory device of claim 1 wherein there is one of said slave latches for every two of said master latches.

6. The memory device of claim 1 wherein there are two of said slave latches for every three of said master latches.

7. The memory device of claim 1 wherein said output port includes an output buffer.

8. The memory device of claim 1 wherein said first and second transfer gates comprise field effect transistors.

9. The memory device of claim 1 further comprising means for precharging the input terminals of said master latches.

10. The memory device of claim 1 further comprising a pointer connected to said write line buffer to indicate which bit of said write line buffer is presently to be written.

11. The memory device of claim 1 further comprising a pointer connected to said read line buffer to indicate from which slave latch data is to be transferred to said output port.

12. A method for operating a high speed FIFO memory, comprising the steps of:
  a) providing data via an input port to a write line buffer;
  b) transferring said data to a memory array from said write line buffer;
  c) after the first N bits of data have been stored in said memory aray; transferring said first N bits of data from said memory array to N master latches in a read line buffer;
  d) in response to a read signal, transferring said first N bits of said data from said master latches to slave latches and transferring said first N bits of data to an output port from said slave latches;
  e) after said first N bits have been transferred to said slave latches, transferring the next N bits of data to said master latches and then transferring said next N bits of data to said slave latches after the data previously stored in said slave latches has been transferred to said output port, then transferring said next N bits of data to said output port; and
  repeating step e until all data stored in said memory array has been transferred to said output port.

* * * * *